(12) United States Patent
Ledger et al.

(10) Patent No.: US 7,292,932 B1
(45) Date of Patent: Nov. 6, 2007

(54) SYSTEM AND METHOD FOR CONTROLLING SPEED OF AN ENGINE

(75) Inventors: David Ledger, Dearborn, MI (US); George Dolan, Commerce Township, MI (US); Jason Konopa, Dearborn, MI (US); Jeffrey Boismier, Rockwood, MI (US); Floyd Cadwell, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/559,039

(22) Filed: Nov. 13, 2006

(51) Int. Cl.
*F02D 41/14* (2006.01)
*G06G 7/70* (2006.01)

(52) U.S. Cl. .................. 701/110; 123/350; 73/35.06

(58) Field of Classification Search .......... 701/59, 701/110, 111, 114, 115; 123/350, 406.29, 123/406.39; 477/36, 80, 91, 116; 180/65.2, 180/65.3, 65.6; 73/35.01, 35.06, 35.09
See application file for complete search history.

(56) References Cited

U.S. PATENT DOCUMENTS

| 5,602,459 A | 2/1997 | Rogers |
| 5,632,352 A | 5/1997 | Jeanneret et al. |
| 5,806,617 A | 9/1998 | Yamaguchi |
| 6,278,915 B1 | 8/2001 | Deguchi et al. |
| 6,443,126 B1* | 9/2002 | Morimoto et al. ..... 123/339.15 |
| 6,621,244 B1 | 9/2003 | Kiyomiya et al. |
| 6,937,930 B2 | 8/2005 | Pirotais |
| 7,085,645 B2* | 8/2006 | Matsuda et al. ............ 701/110 |
| 2001/0017227 A1 | 8/2001 | Amano et al. |
| 2002/0163199 A1 | 11/2002 | Ramaswamy et al. |
| 2004/0198551 A1 | 10/2004 | Joe et al. |
| 2005/0102082 A1 | 5/2005 | Joe et al. |

* cited by examiner

*Primary Examiner*—Willis R. Wolfe
*Assistant Examiner*—Johnny H. Hoang
(74) *Attorney, Agent, or Firm*—David B. Kelley; Brooks Kushman P.C.

(57) ABSTRACT

A system and method for controlling the speed of an engine includes determining a desired engine power output and engine speed, and determining whether the desired engine speed is within one of a number of predetermined engine speed ranges. It is then determined whether a noise-vibration level for the vehicle is within a target range when it is determined that the desired engine speed is within one of the predetermined engine speed ranges. The noise-vibration level is a function of at least one of a corresponding vibration level for one or more vehicle mechanical systems, and a noise level for the passenger compartment for the engine operating at the desired engine speed. The engine is then controlled at the desired engine speed when the determined noise-vibration level is within a target range, and it is determined that the desired engine speed is within one of the predetermined engine speed ranges.

18 Claims, 6 Drawing Sheets

SYSTEM AND METHOD FOR CONTROLLING SPEED OF AN ENGINE

BACKGROUND OF THE INVENTION

1. Field of the Invention

The present invention relates to a system and method for controlling the speed of an engine in a vehicle.

2. Background Art

The operation of an engine in a vehicle can, at times, create undesirable noise and vibrations that detract from vehicle passenger comfort. This may be particularly true if the engine is allowed to operate at a frequency that is at or near the resonant frequency of a mechanical component or system within the vehicle. When this occurs, the vibrations in the mechanical system caused by the engine can increase significantly. To address this problem, at least one known vehicle predetermines allowable engine idle speeds such that the frequency of engine operation at these speeds will not match the resonant frequency of any of a chosen number of vehicle mechanical components and systems. In such a case, the allowable engine idle speed is a static value that is not adjusted in light of changing vehicle operating conditions.

One vehicle operating condition that may be of particular concern with regard to noise and vibration is the charging of a high voltage battery in a hybrid electric vehicle (HEV). When the high voltage battery in an HEV is charged, it effectively applies an extra load to the engine—this is known as lugging. When lugging occurs, certain vibration modes in the vehicle may be excited, and in general, noise and vibration levels in the passenger compartment may be amplified. Conventional engine idle control systems do not adequately address this issue, in that charging the high voltage battery can cause the engine to create undesirably high vibrations and noise even when the frequency is outside the resonant frequency range of the vehicle mechanical systems.

Therefore, a need exists for a system and method for controlling the speed of an engine that not only consider the resonant frequencies of various vehicle mechanical systems, but also consider noise and vibration when determining the engine speed.

SUMMARY OF THE INVENTION

Embodiments of the present invention provide a system and method for controlling the speed of an engine based on a number of factors. For example, in some embodiments, a state of charge (STATE OF CHARGE) of a high voltage battery in an HEV is considered along with a number of other inputs, for example, vehicle speed and vehicle accessory current loads. These inputs are used to help determine a desired engine power output, and along with a Modal Separation Chart, an appropriate engine speed is determined. The Modal Separation Chart can be viewed as a map which indicates the resonant frequency or frequencies for vehicle mechanical systems under consideration. Although it is referred to here as a "chart", it can be programmed into a controller or controllers as a look-up table or some other type of accessible reference data.

Once a desired engine speed is determined based on the desired engine power output—which itself can be determined from the inputs described above—this determined speed can be compared to the Modal Separation Chart to ensure that the engine will not generate vibrations at a frequency that are at or near any of the resonant frequencies of the vehicle mechanical systems. Once the idle speed is selected by filtering the desired engine speed through the Modal Separation Chart, embodiments of the system and method look at one or more factors related to noise and vibration.

In some embodiments, a noise-vibration level for the vehicle can be examined to determine if it is within a target range. The noise-vibration level may be conveniently referred to as an NVH level, which stands for noise, vibration and harshness. Determining the NVH level for the vehicle may include examining the vibrations of a number of vehicle mechanical systems, such as a steering wheel or a seat track, as well as the level of noise in the vehicle passenger compartment. Even though the desired engine speed was filtered through the modal separation chart, and therefore, should not be at or near the resonant frequency of any of the vehicle mechanical systems included on the chart, the NVH level may still be undesirably high, particularly if the high voltage battery is being charged. Embodiments of the present invention, therefore, provide a system and method for adjusting the engine speed to ensure that the NVH level is within a predetermined target range.

Embodiments of the present invention also provide a method for controlling speed of an engine in a vehicle including at least one mechanical system, a battery, and a passenger compartment. The method includes determining a desired engine power output, and using at least the desired engine power output to determine a desired engine speed. It is then determined whether the desired engine speed is within one of a plurality of predetermined engine speed ranges. When it is determined that the desired engine speed is within one of the predetermined engine speed ranges, it is then determined whether a noise-vibration level for the vehicle is within a target range. The determined noise-vibration level is a function of at least one of a corresponding vibration level for at least one vehicle mechanical system and a sound level for the passenger compartment. For purposes of determining the noise-vibration level, the corresponding vibration level for the at least one vehicle mechanical system and for the sound level of the passenger compartment are examined considering the engine to be operating at the desired engine speed. When it is determined that the desired engine speed is within one of the predetermined engine speed ranges and the determined noise-vibration level is within the target range, the engine is controlled at the desired engine speed.

In situations where the desired engine speed is not within one of the predetermined engine speed ranges, the desired engine speed is adjusted to a new desired engine speed. The steps described above may be repeated with the new desired engine speed to determine if a new noise-vibration level for the vehicle is within the target range. To the extent that the new desired engine speed is within one of the predetermined ranges, and the new determined noise-vibration level is within the target range, the engine is controlled to operate at the new desired engine speed.

The example given above provides a mechanism for adjusting the desired engine speed so that it lies within one of the predetermined engine speed ranges as indicated by the Modal Separation Chart; however, it may also be advantageous to adjust the engine speed based on the noise-vibration level. For example, even if the desired engine speed is within one of the predetermined engine speed ranges, the determined noise-vibration level may not be within the target range. In such a case, the engine speed is again adjusted, it is again analyzed to see if fits within one of the predetermined engine speed ranges, and a new noise-vibration level for the vehicle is determined. The new noise-vibration level is examined to see if it is within the target range. Thus, embodiments of the present invention provide for adjusting the engine speed based on a number of factors, thereby providing additional comfort for the vehicle occupants.

Although embodiments of the present invention may be directed toward controlling the speed of the engine when the engine is idling, at least some embodiments can be used for higher engine speeds. For example, when the vehicle is moving at a relatively low speed, it may still be advantageous to use the present invention to help ensure that noise and vibration levels within the passenger compartment are acceptable. Once the vehicle speed increases beyond a certain point, vibrations from the road and wind noise can mask much of the noise and vibration within the vehicle passenger compartment. Embodiments of the present invention can also take advantage of this relationship. For example, the NVH level for the vehicle can be examined for a number of battery charging rates and engine idle speeds. Using knowledge of the vehicle speed, it may be possible to choose higher battery charging rates while still maintaining an acceptable NVH level. This is possible, because embodiments of the present invention consider the change in noise and vibration for various mechanical systems as the engine speed changes. Thus, choosing the appropriate engine speed during a high rate of battery charging can still provide a lower NVH level than when the battery charging rate is low.

Different embodiments of the present invention may use different systems and methods to determine an appropriate NVH level for the vehicle. For example, in one embodiment, a steering wheel vibration, a seat track vibration, and a sound level for the vehicle interior are examined. The amplitude of each of these parameters is related to the engine speed, such that each may be higher or lower depending on the engine speed. In addition, these three parameters will likely not have relative maxima and relative minima at the same engine speeds. Therefore, there will be a competing interest between minimizing the level of one of these parameters versus the other two. In such a case, an arbitration scheme may be used, for example, by applying weighting factors to the three parameters to provide an appropriate resolution.

Embodiments of the present invention also include a control system for controlling the speed of an engine in a vehicle. The vehicle includes at least one mechanical system, a battery and a passenger compartment. The control system includes a sensor configured to sense vibrations in at least one vehicle mechanical system, and to output signals related to the sensed vibrations. The control system also includes a controller that is configured to receive a plurality of inputs related to operation of the vehicle, and to determine a desired engine power based on the inputs received. The desired engine power is used by the controller to determine a desired engine speed, and the controller then determines whether the desired engine speed is within one of a plurality of predetermined engine speed ranges.

The controller is also configured to receive the signals from the sensor and determine whether a noise-vibration level for the vehicle is within a target range—this determination is made after it has been determined that the desired engine speed is within one of the predetermined engine speed ranges. The determined noise-vibration level is based on at least one of the signals received from the sensor. The controller controls the engine at the desired engine speed when the determined noise-vibration level is within the target range, and it is determined that the desired engine speed is within one of the predetermined engine speed ranges.

DETAILED DESCRIPTION OF THE PREFERRED EMBODIMENT(S)

Figure 1:
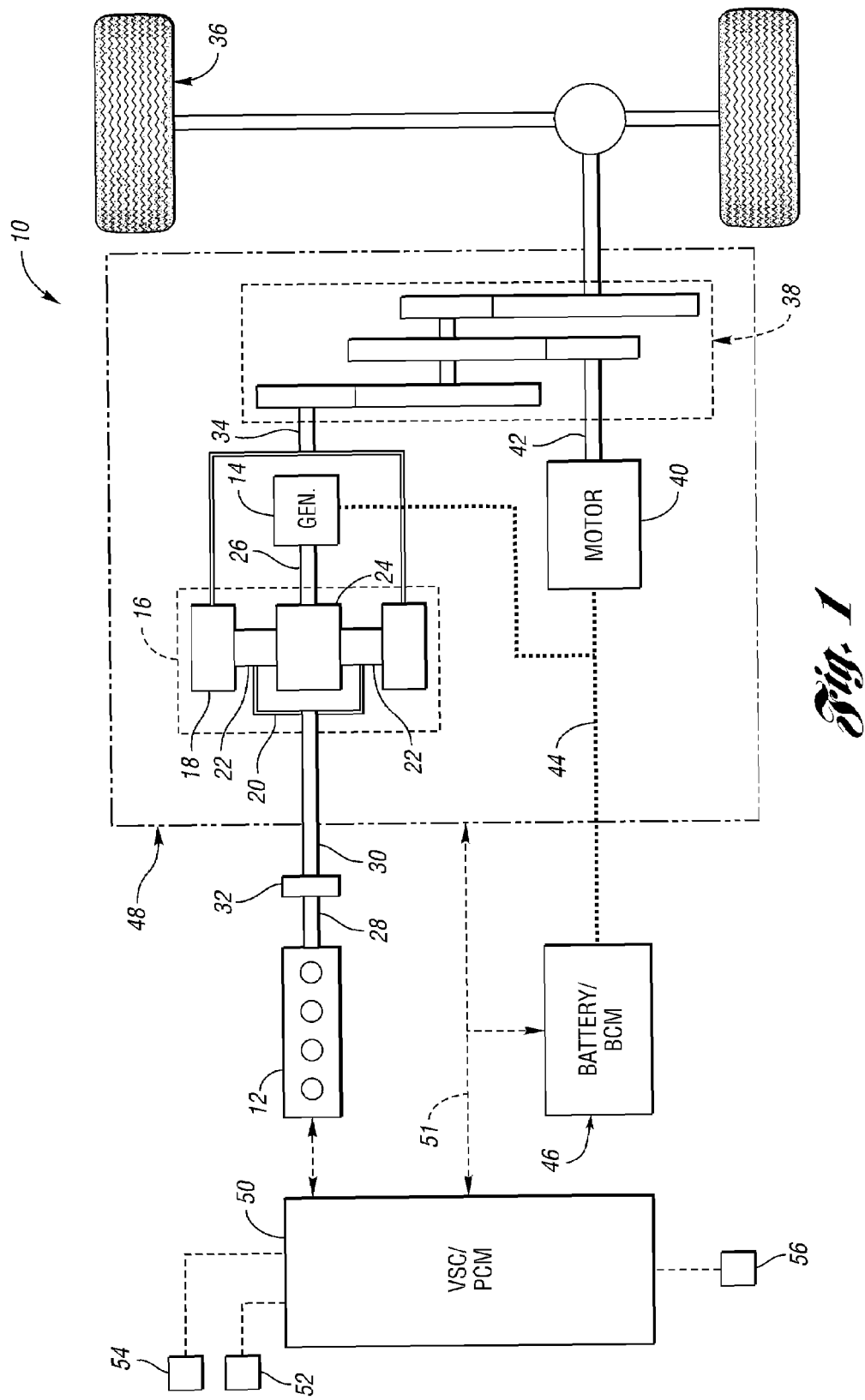
FIG. 1 shows a schematic representation of a hybrid electric vehicle including a control system in accordance with an embodiment of the present invention.

FIG. 1 shows a schematic representation of a vehicle 10 in which the system and method of the present invention can be used. The vehicle 10 includes an engine 12 and an electric machine, or generator 14. The engine 12 and the generator 14 are connected through a power transfer arrangement, which in this embodiment, is a planetary gear arrangement 16. Of course, other types of power transfer arrangements, including other gear sets and transmissions, may be used to connect the engine 12 to the generator 14. The planetary gear arrangement 16 includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a crankshaft 28, which is connected to a shaft 30 through a passive clutch 32. The clutch 32 provides protection against over-torque conditions. The shaft 30 is connected to the carrier 20 of the planetary gear arrangement 16, and the ring gear 18 is connected to a shaft 34, which is connected to a first set of vehicle drive wheels, or primary drive wheels 36, through a gear set 38.

The vehicle 10 includes a second electric machine, or motor 40, which can be used to output torque to a shaft 42 connected to the gear set 38. Other vehicles within the scope of the present invention may have different electric machine arrangements, such as more or fewer than two electric machines. In the embodiment shown in FIG. 1, the electric machine arrangement—i.e., the motor 40 and the generator 14—can both be used as motors to output torque. Alternatively, each can also be used as a generator, outputting electrical power to a high voltage bus 44 and to an energy storage system, or battery 46, which includes a battery control module (BCM).

The battery 46 is a high voltage battery that is capable of outputting electrical power to operate the motor 40 and the generator 14. The BCM acts as a controller for the battery 46. Other types of energy storage systems can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear arrangement 16, and a portion of the second gear set 38 may generally be referred to as a transmission 48. To control the engine 12 and components of the transmission 48—i.e., the generator 14 and motor 40—a control system, shown generally as controller 54, is provided. As shown in FIG. 1, the controller 50 is a vehicle system controller (VSC). Although it is represented by a single controller, a control system in accordance with the present invention may include multiple controllers.

A controller area network (CAN) 51 allows the VSC 50 to communicate with the transmission 48 and the BCM. Just as the battery 46 includes a BCM, other devices controlled by the VSC 50 may have their own controllers. For example, an engine control unit (ECU) may communicate with the VSC 50 and may perform control functions on the engine 12. In addition, the transmission 48 may include a transmission control module (TCM), configured to coordinate control of specific components within the transmission 48, such as the generator 14 and/or the motor 40. Some or all of these various controllers can make up a control system for the vehicle 10.

The VSC 50 is configured to receive a number of inputs that provide information related to the operation of the vehicle 10. Although not all of the inputs are described herein, a number of these inputs can be used by the system and method of the present invention. For example, sensors 52, 54 are configured to sense vibrations in respective vehicle mechanical systems. For example, the sensor 52 may be configured to detect vibrations in a steering wheel, while the sensor 54—or a plurality of the sensors 54—may be used to detect vibrations in one or more seat tracks which have the vehicle seats attached thereto. An acoustic sensor 56 can be configured to detect sound in the vehicle passenger compartment. As described more fully below, each of these sensor inputs can be used by the VSC 50 to control the speed of the engine 12 in accordance with the present invention.

Figure 2:
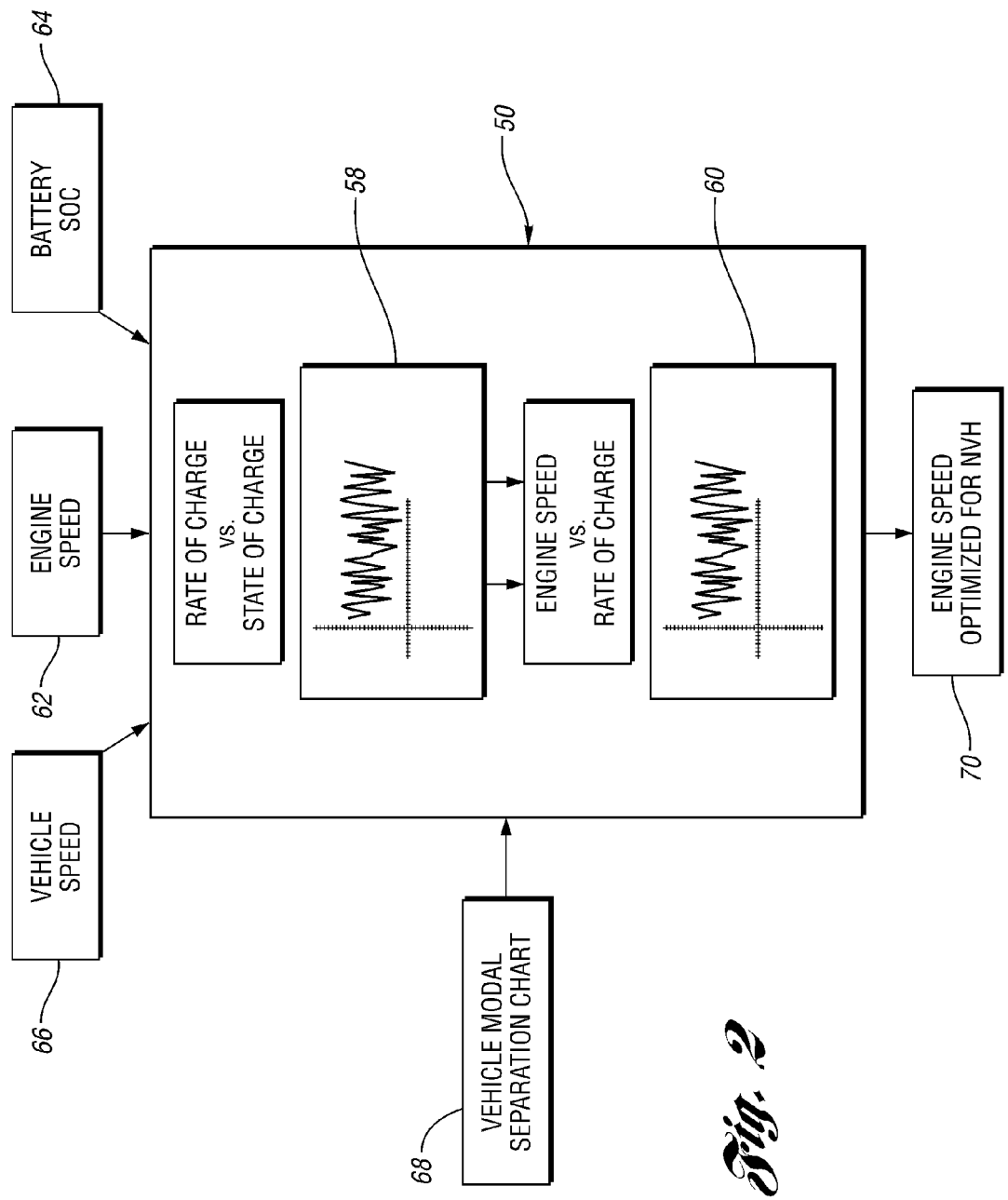
FIG. 2 shows a schematic representation of a vehicle system controller shown in FIG. 1.

FIG. 2 shows the VSC 50 including some preprogrammed information residing therein. In addition, a number of inputs are received by the VSC 50, which processes them and provides an output. In particular, in the embodiment shown in FIG. 2, the VSC 50 is preprogrammed with information related to a rate of charge of the battery 46 versus the state of charge (STATE OF CHARGE) of the battery 46. This is represented in FIG. 2 by the graph 58. As is well known to those familiar with control system strategy, this information may actually reside within the VSC 50 in the form of a lookup table, a polynomial function, or some other form of electronic information storage. In addition to the rate of charge versus STATE OF CHARGE, the VSC 50 also includes information related to the speed of the engine 12 versus the rate of charge of the battery 46. Again, this is illustrated in FIG. 2 in the form of a graph 60. This information can also be stored in any electronic format effective to allow for access and use by the VSC 50. Although the detail of the graph 58 is not visible in FIG. 2, it will generally reflect that higher rates of charge are desired when the STATE OF CHARGE is lower. This helps to charge the battery 46 more quickly, thereby making the electrical power available to the vehicle systems.

The graph 60, will generally show that higher engine speeds are required for higher rates of charge. It may be undesirable, however, to increase the engine speed solely based on a desired rate of battery charge. This is because at certain speeds, the engine 12 may cause undesirably high vibration in vehicle mechanical systems, or undesirably high sound levels in a vehicle passenger compartment. Therefore, the present invention contemplates the use of a number of inputs to be processed along with the preprogrammed data in the VSC 50 to provide an optimized desired engine speed. For example, inputs 62, 64 respectively represent a current engine speed and battery STATE OF CHARGE. Of course, in some cases, the engine 12 may be shut down, in which case the engine speed input 62 will be zero. In addition to the inputs 62, 64, an input 66 indicating the vehicle speed is also provided to the VSC 50. As described above, higher vehicle speeds can allow higher engine speeds and more aggressive rates of charge to be implemented because vibration and noise from the road will mask some of the undesirable vibration and noise associated with the vehicle operation.

In addition to the inputs 62, 64, 66, the VSC 50 also receives inputs from a vehicle Modal Separation Chart 68. Although shown as an input to the VSC 50, the Modal Separation Chart 68 can also be preprogrammed into the VSC 50, for example, in the form of a lookup table. As described more fully below, the VSC 50 processes the information it receives from the various inputs along with the information that is preprogrammed into it, and provides as an output 70 an optimized or desired engine speed based on a noise-vibration level being within a target range. As noted above, the noise-vibration level is often indicated by the "NVH" abbreviation.

Figure 3:
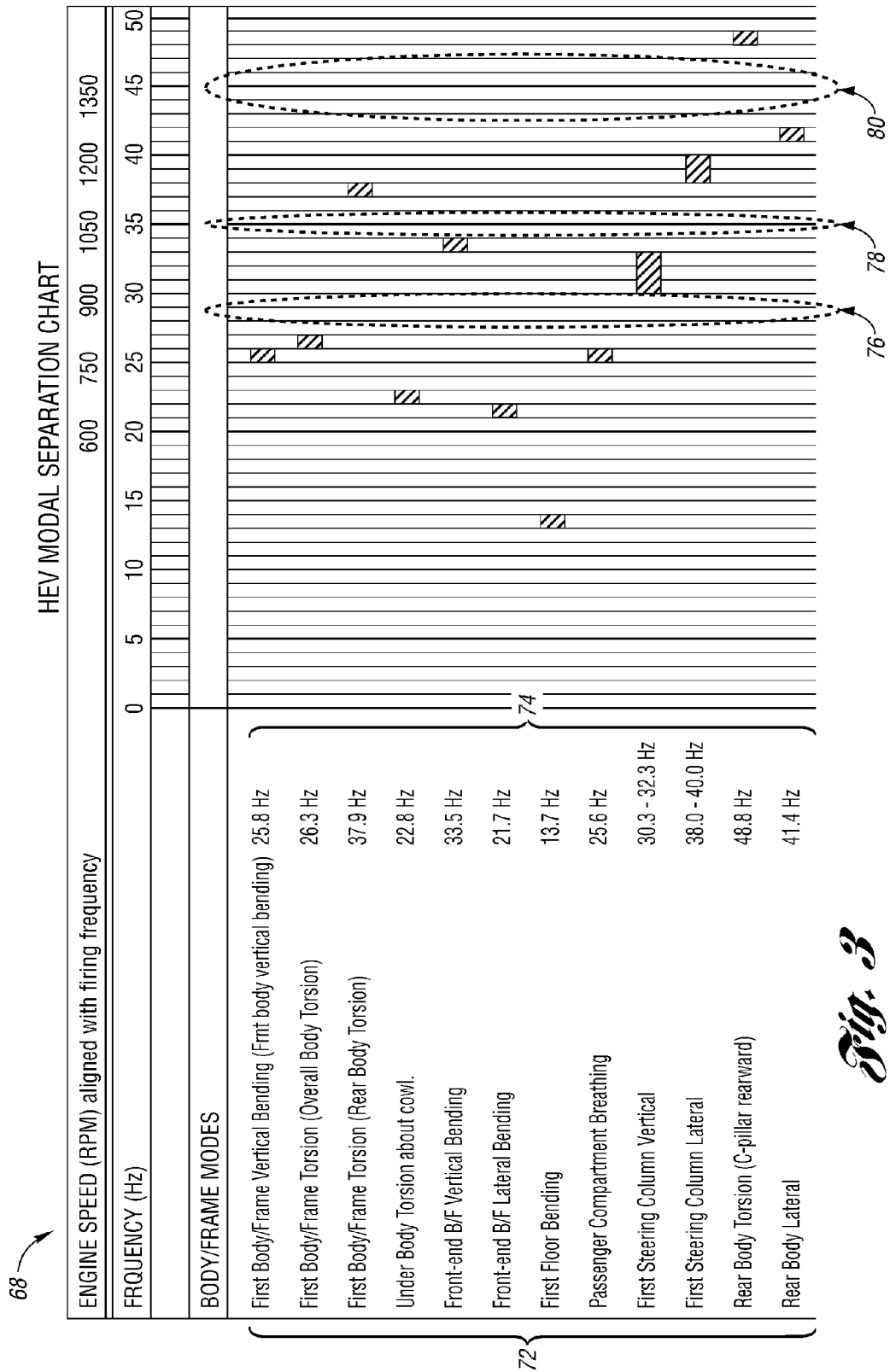
FIG. 3 shows a Modal Separation Chart used in accordance with embodiments of the system and method of the present invention.

FIG. 3 shows in detail the Modal Separation Chart 68. The lefthand side of the chart 68 shows a number of vehicle mechanical systems 72 that are chosen for consideration. For each of the mechanical systems 72, the chart 68 also shows a corresponding resonant frequency shown generally at 74. On the right side of the chart, the resonant frequencies are indicated by the dark-colored horizontal bars, and are arranged according to their frequency in Hertz (Hz). For the Modal Separation Chart 68, shown in FIG. 3, there are three predetermined engine speed ranges 76, 78, 80 in which it is desirable to set the engine idle speed. As noted above, although the system and method of the present invention may be effective for controlling the speed of an engine when it is idling, embodiments of the present invention can also be applied to higher engine speeds while the vehicle is moving. As shown in FIG. 3, each of the engine speed ranges 76, 78, 80 avoids the resonant frequencies 74 of any of the vehicle mechanical systems 72. This helps to ensure that vibration in the vehicle mechanical systems 72 will not become undesirably high.

Figure 4:
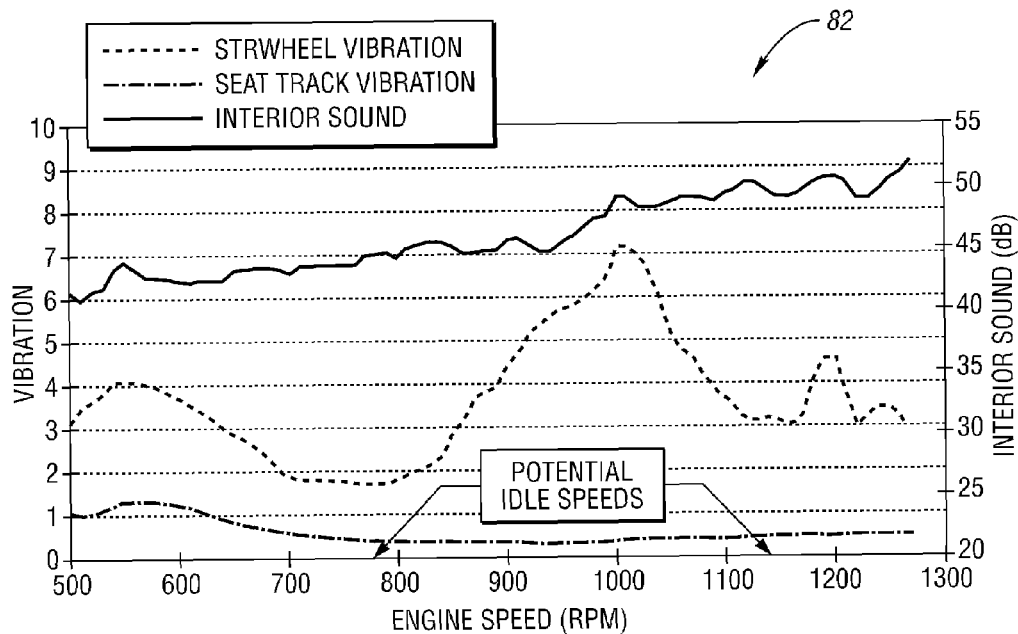
FIG. 4 shows a graph illustrating the relationship between vibration and sound levels and engine speed for the vehicle shown in FIG. 1.

In addition to choosing a desired engine speed outside of the resonant frequencies of the vehicle mechanical systems 72—i.e., choosing an engine speed within one of the predetermined engine speed ranges 76, 78, 80—the present invention also contemplates adjustment of the engine speed to minimize NVH even while the engine 12 is operating within one of the predetermined engine speed ranges 76, 78, 80. FIG. 4 shows a graph 82 showing the relationship between engine speed, the sound within the vehicle passenger compartment, and vibration for two vehicle mechanical systems—i.e., seat track vibration and steering wheel (STR-WHEEL) vibration. As shown in FIG. 4, the sound in the vehicle passenger compartment (interior sound) generally increases with increasing engine speed. Within this generally increasing trend line, however, are a number of local minima and maxima. The same is true of the vibration of the seat track, and the steering wheel, which is more prone to variation than the other two parameters.

As shown on the graph in FIG. 4, there are two "potential idle speeds" respectively indicated just below 800 revolutions per minute (RPM) and just above 1100 RPM. These two values represent engine speeds where the steering wheel vibration is at a local minimum. The present invention contemplates adjustment of the engine idle speed to a level at or near one of these "potential idle speeds" in order to minimize the vibration in the steering wheel. Of course, it may still be important to maintain the engine idle speed within one of the predetermined engine speed ranges, as shown in the Modal Separation Chart 68 in FIG. 3. Therefore, the initial engine idle speed, chosen with the input 62-68, shown in FIG. 2, can be adjusted up or down to approach one of the potential idle speeds shown in FIG. 4, while still maintaining the engine speed within one of the predetermined engine speed ranges.

Exactly matching the engine speed with one of the potential idle speeds, may cause the engine speed to coincide with the resonant frequency of one of the vehicle mechanical systems 72, shown in FIG. 3. It is understood that when describing an engine speed and comparing it to a resonant frequency, any given engine speed has associated with it a certain frequency of operation. For example, if the engine 12 shown in FIG. 1 is an I4 engine, it has a second order firing frequency—i.e., two firing impulses per revolution of the engine crankshaft. In such a case, the frequency of operation for the engine 12 would be twice the engine speed in RPM's, divided by 60 seconds/minute. In this way, the speed of the engine can be transformed into an operation frequency that can be compared directly to the resonant frequency of various vehicle mechanical systems.

The graph 82 shown in FIG. 4 is based on vehicle operation with the battery 46 being charged at a certain predetermined rate. As described above, the rate of battery charge may be increased depending on such factors as the battery STATE OF CHARGE and the vehicle speed. Thus, it may be helpful to consider sound and vibration curves, such as shown in FIG. 4, for a number of different rates of battery charge, since the local minima and maxima may appear at different engine speeds for the different rates of charge.

Figure 5A:
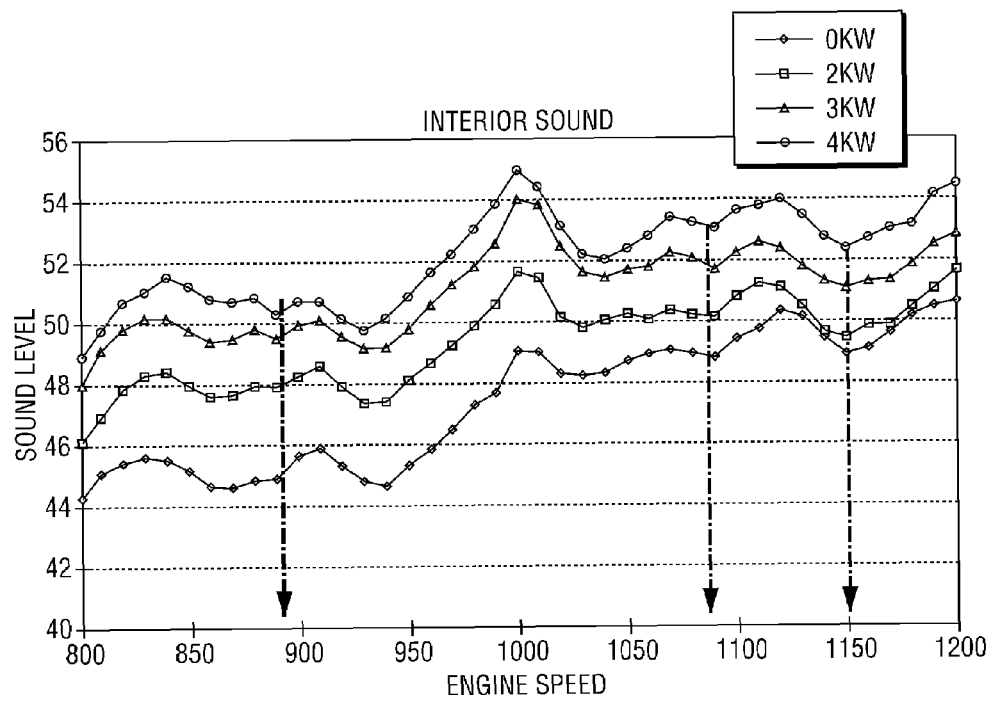
FIGS. 5A-5C show sound and vibration levels at different engine speeds for four different rates of battery charging.
Figure 5B:
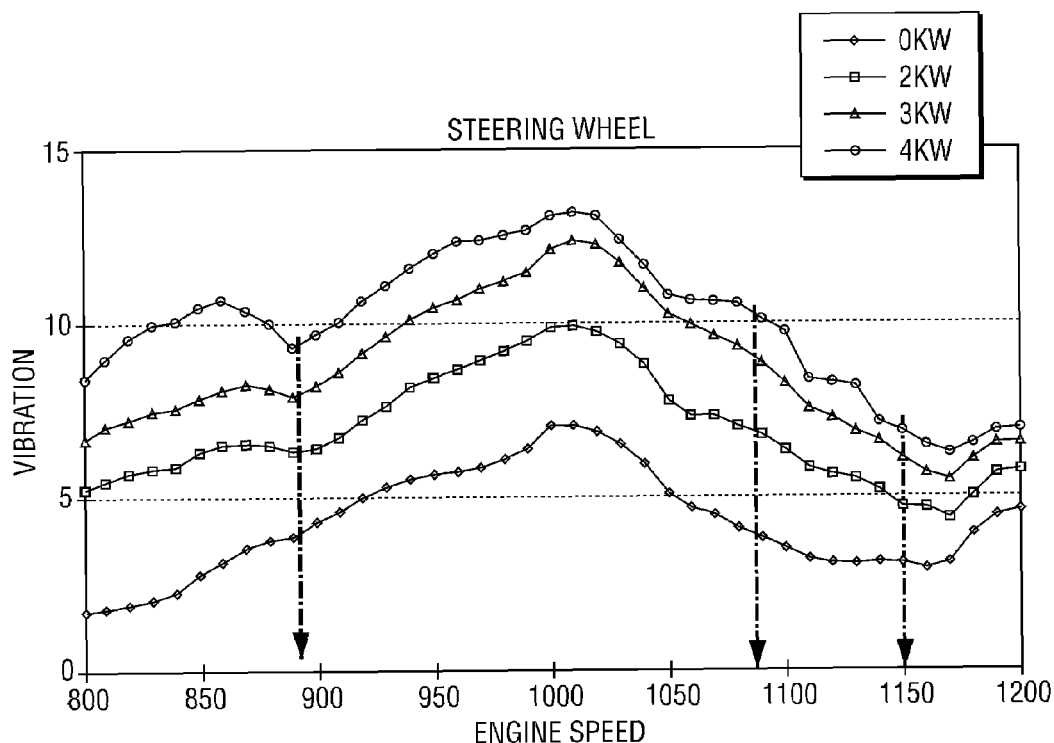
Figure 5C:
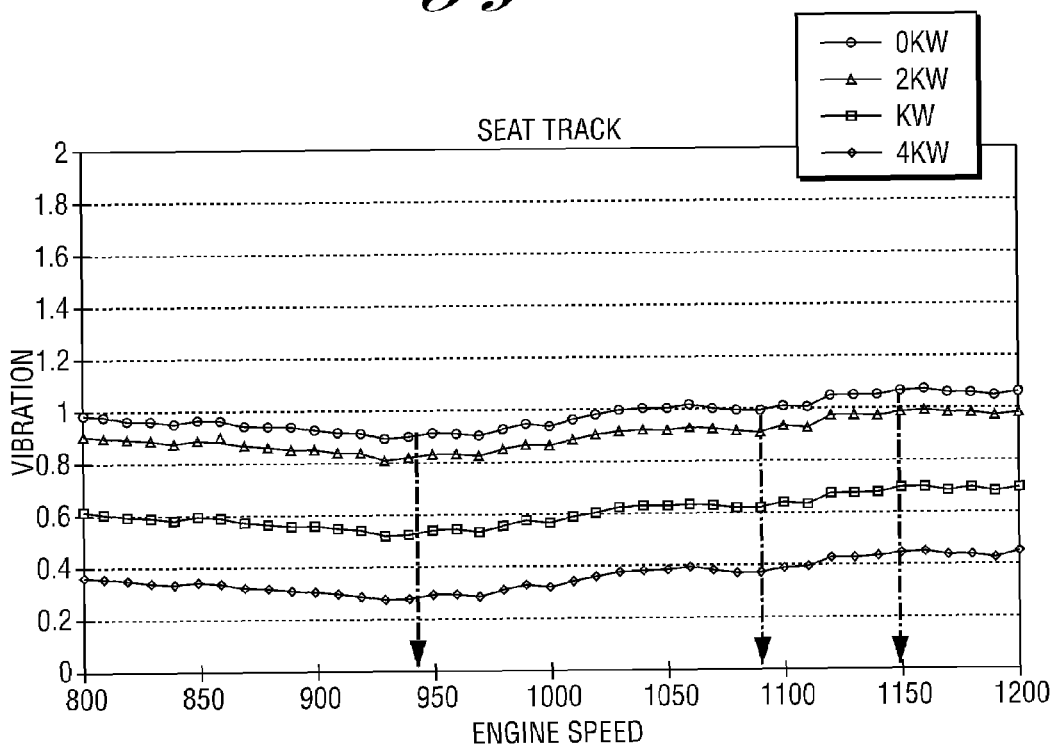

FIGS. 5A-5C respectively show sound level curves for a vehicle interior, steering wheel vibration curves, and seat track vibration curves for four different battery rates of charge: 0 kilowatts (kW), 2 kW, 3 kW, and 4 kW. In each of these drawing figures, it is seen that the respective sound level or vibration level increases with increasing rates of battery charge. Despite differences in the sound level or vibration level amplitude, the points of relative minima and maxima are generally the same for any given set or curves regardless of the rate of charge. For example, in FIG. 5A, relative minima are indicated at engine speeds just below 900 RPM, just below 1100 RPM, and at approximately 1150 RPM. Each of these points is indicated by the vertical line pointing to the corresponding engine speed. Similarly, FIG. 5B, which shows vibration levels for the steering wheel based on different rates of battery charge, shows that relative minima occur at virtually the same engine speeds as those for the sound level shown at FIG. 5A. In contrast, the vibration level of the seat track shown in FIG. 5C, has at least one relative minima at a higher engine speed—i.e., the lowest relative minima is indicated just below 950 RPM, rather than just below 900 RPM.

The information shown in FIGS. 5A-5C can also be programmed into the VSC 50, for example, as a lookup table or some other method of storage. In this way, the VSC 50 can determine if it is possible to increase the rate of battery charge, while still keeping the sound and vibration levels within respective acceptable ranges. It is worth noting that although FIGS. 5B and 5C provide information regarding the vibrations in the steering wheel and the seat track or seat tracks of a vehicle, such as the vehicle 10, the vibrations measured in other vehicle mechanical systems can be used in conjunction with, or in place of, the steering wheel and seat track.

As indicated by the graphs shown in FIGS. 5A-5C, the relative maxima and minima for the sound level in the vehicle passenger compartment and vibration levels for various mechanical systems may not occur at the same engine speeds. In such a case, it may be appropriate to use some kind of arbitration scheme or weighting system to determine an overall acceptable NVH level for the vehicle 10. For example, if the steering wheel vibration is the most important, the VSC 50 can be configured to always output an engine speed that keeps the steering wheel vibration at an acceptable level even if the seat track vibration or the sound level is outside a respective desired range. Alternatively, embodiments of the present invention may require that each of the sound level, steering wheel vibration, and the seat track vibration be within a respective target range before the engine speed is accepted.

Figure 6:
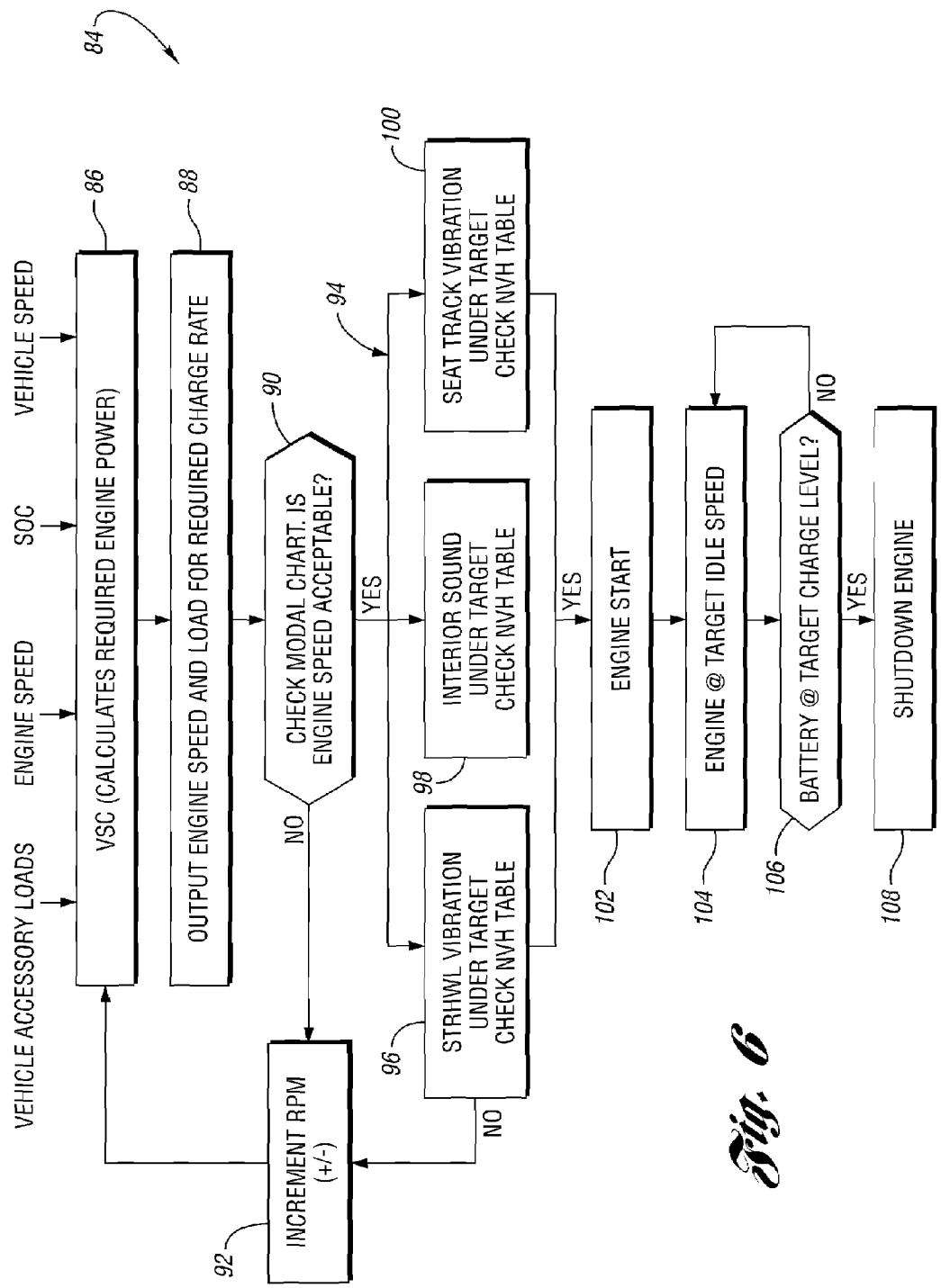
FIG. 6 shows a flow chart illustrating an embodiment of a method in accordance with the present invention.

FIG. 6 shows a flow chart 84 illustrating an embodiment of a method in accordance with the present invention. At step 86, the VSC 50 receives a number of inputs, such as the electrical loads of a number of vehicle accessories, the engine speed, the battery STATE OF CHARGE, and the vehicle speed. Using these inputs, the VSC 50 calculates a desired engine power output and engine speed that provides sufficient power to run the generator 14 to charge the battery 46, and to also provide power for the vehicle accessory loads, such as air conditioning, headlights, and other various electric and electronic systems—see step 88. This desired engine speed is then checked against the Modal Separation Chart 68, shown in FIG. 3—see decision block 90. If the initial desired engine speed is not within one of the predetermined engine speed ranges 76, 78, 80, the engine speed is adjusted at step 92 and a new desired engine speed is calculated and checked by repeating steps 86, 88, 90.

If, at decision block 90, it is determined that the desired engine speed is within one of the predetermined engine speed ranges 76, 78, 80, the next step is to determine whether a noise-vibration level for the vehicle 10 is within a target range. This is shown in FIG. 5 collectively at step 94, which includes: step 96, checking the vibration level of the steering wheel; step 98, checking the sound level of the vehicle passenger compartment; and step 100, checking the vibration level of the seat track. As described in detail above, different embodiments of the present invention may impose different requirements for the NVH level determined at step 94. For example, it may be required that each of the vibration and sound levels meet respective target levels, or it may be that at least one or at least two must meet a respective target level before the overall vehicle NVH level is considered acceptable. If the NVH level is not considered acceptable, the method loops back to step 92, where the desired engine speed is adjusted to a new desired engine speed which is calculated and checked by repeating steps 86-94.

If it is determined that the desired engine speed (or the new desired engine speed) is within one of the predetermined engine speed ranges 76, 78, 80, and the NVH level for the vehicle as determined at step 94 is acceptable, the engine is started at step 102. Of course, if the engine 12 is already operating, step 102 is omitted. With the desired engine speed calculated, and the engine operating, the VSC 50 controls the engine speed at the target idle speed—see step 104. The engine speed can be controlled by any method effective to achieve the desired engine speed, such as adjusting throttle position or other air and fuel adjustments. In addition, the VSC 50 may control the engine speed directly, or it may control it through communication with different controllers, such as an engine control unit (not shown). In an HEV, such as the vehicle 10 shown in FIG. 1, the engine will often be operated until the battery 46 achieves a target state of charge—see step 106. Until such time as the target state of charge is reached, the method will loop back to step 104, and the engine 12 will continue to be operated at the desired, or target idle speed. Once the battery 46 has reached its target state of charge, the engine 12 is shut down at step 108.

While the best mode for carrying out the invention has been described in detail, those familiar with the art to which this invention relates will recognize various alternative designs and embodiments for practicing the invention as defined by the following claims.

What is claimed is:

1. A method for controlling speed of an engine in a vehicle including at least one mechanical system, a battery, and a passenger compartment, the method comprising:
   determining a desired engine power output;
   using at least the desired engine power output to determine a desired engine speed;
   determining whether the desired engine speed is within one of a plurality of predetermined engine speed ranges;
   determining a noise-vibration level for the vehicle as a function of at least one of a corresponding vibration level for at least one vehicle mechanical system and a sound level for the passenger compartment for the engine operating at the desired engine speed;
   determining whether the noise-vibration level is within a target range when it is determined that the desired engine speed is within one of the predetermined engine speed ranges; and
   controlling the engine at the desired engine speed when the determined noise-vibration level is within the target range and it is determined that the desired engine speed is within one of the predetermined engine speed ranges.

2. The method of claim 1, further comprising:
   adjusting the desired engine speed to a new desired engine speed when it is determined that the desired engine speed is not within one of the predetermined engine speed ranges;
   determining whether the new desired engine speed is within one of the predetermined engine speed ranges;
   determining whether a new noise-vibration level for the vehicle is within the target range when it is determined that the new desired engine speed is within one of the predetermined engine speed ranges, the new determined noise-vibration level being a function of at least one of a corresponding vibration level for at least one vehicle mechanical system and a sound level for the passenger compartment for the engine operating at the new desired engine speed; and
   controlling the engine at the new desired engine speed when the new determined noise-vibration level is within the target range and it is determined that the new desired engine speed is within one of the predetermined engine speed ranges.

3. The method of claim 1, further comprising:
   adjusting the desired engine speed to a new desired engine speed when the determined noise-vibration level is outside the target range;
   determining whether the new desired engine speed is within one of the predetermined engine speed ranges;
   determining whether a new noise-vibration level for the vehicle is within the target range when it is determined that the new desired engine speed is within one of the predetermined engine speed ranges, the new determined noise-vibration level being a function of at least one of a corresponding vibration level for at least one vehicle mechanical system and a sound level for the passenger compartment for the engine operating at the new desired engine speed; and
   controlling the engine at the new desired engine speed when the new determined noise-vibration level is within the target range and it is determined that the new desired engine speed is within one of the predetermined engine speed ranges.

4. The method of claim 1, further comprising:
   controlling the engine at the desired engine speed while the state of charge of the battery is below a predetermined state of charge; and
   shutting down the engine when it is determined that the state of charge of the battery is at or above the predetermined state of charge.

5. The method of claim 1, wherein the step of controlling the engine at the desired engine speed includes starting the engine when the engine is shutdown.

6. The method of claim 1, the vehicle mechanical systems including a steering wheel and a seat track, and wherein the determined noise-vibration level is a function of at least a vibration level for the steering wheel and a vibration level for the seat track.

7. The method of claim 6, wherein the determined noise-vibration level is further a function of a sound level for the passenger compartment.

8. The method of claim 7, wherein the step of determining whether a noise-vibration level for the vehicle is within a target range includes using weighting factors applied to each of: the vibration level for the steering wheel, the vibration level for the seat track, and the sound level for the passenger compartment.

9. The method of claim 1, wherein the step of determining a desired engine power output is based on a plurality of vehicle conditions including a speed of the vehicle and a battery state of charge, the method further comprising determining a desired charge rate for the battery based at least in part on the speed of the vehicle and the battery state of charge.

10. A method for controlling speed of an engine in a vehicle including a plurality of mechanical systems, a battery, and a passenger compartment, the method comprising:
   determining a desired engine power based on at least one condition of the vehicle;
   using at least the desired engine power to determine a desired engine speed;
   determining an engine frequency based on the desired engine speed;
   comparing the engine frequency to modal separation values which indicate a corresponding resonant frequency for at least one of the vehicle mechanical systems;
   using the desired engine speed as a target engine speed when the engine frequency is outside the at least one corresponding resonant frequency;
   determining a noise-vibration level for the vehicle based at least in part on vibration of at least one the vehicle mechanical systems for the engine operating at the target engine speed; and
   controlling the engine at the target engine speed when the determined noise-vibration level is within a target range.

11. The method of claim 10, further comprising:
adjusting the desired engine speed to a new desired engine speed when the engine frequency is not outside at least one corresponding resonant frequency;
determining a new engine frequency based on the new desired engine speed; and
using the new desired engine speed as the target engine speed when the new engine frequency is outside at least one corresponding resonant frequency.

12. The method of claim 10, further comprising:
adjusting the desired engine speed to a new desired engine speed when the determined noise-vibration level is not within the target range:
determining a new engine frequency based on the new desired engine speed; and
using the new desired engine speed as the target engine speed when the new engine frequency is outside at least one corresponding resonant frequency.

13. The method of claim 10, the vehicle mechanical systems including a steering wheel and at least one passenger seat mounted on a corresponding seat track, and wherein the step of determining a noise-vibration level for the vehicle includes:
determining a vibration level for the steering wheel;
determining a corresponding vibration level for the at least one seat track; and
determining a sound level for the passenger compartment for the engine operating at the target engine speed.

14. The method of claim 13, wherein the determined noise-vibration level is within the target range when the determined vibration level for the steering wheel is below a predetermined steering wheel vibration level, the determined corresponding vibration of the at least one seat track is below a corresponding seat track vibration level, and the determined sound level in the passenger compartment is below a predetermined passenger compartment sound level.

15. The method of claim 13, further comprising applying a corresponding weighting factor to each of the vibration level of the steering wheel, the corresponding vibration of the at least one seat track, and the sound level for the passenger compartment, the determined noise-vibration level being within the target range when the weighted vibration and sound levels are each below respective predetermined vibration and sound levels.

16. A control system for controlling speed of an engine in a vehicle including at least one mechanical system, a battery, and a passenger compartment, the control system comprising:
a sensor configured to sense vibrations in at least one vehicle mechanical system, and to output signals related to the sensed vibrations; and
a controller configured to:
receive a plurality of inputs related to operation of the vehicle,
determine a desired engine power based on the inputs received,
use the desired engine power to determine a desired engine speed, and
determine whether the desired engine speed is within one of a plurality of predetermined engine speed ranges, the controller being further configured to:
receive the signals from the sensor and determine whether a noise-vibration level for the vehicle is within a target range when it is determined that the desired engine speed is within one of the predetermined engine speed ranges, the determined noise-vibration level being based on at least one the signals received, and
control the engine at the desired engine speed when the determined noise-vibration level is within the target range and it is determined that the desired engine speed is within one of the predetermined engine speed ranges.

17. The control system of claim 16, further comprising an acoustic sensor configured to sense sound in the passenger compartment, and to output signals related to the sensed sounds, the controller being further configured to receive the signals from the acoustic sensor, and to use at least the signals received from the sensors to determine the noise-vibration level for the vehicle.

18. The control system of claim 16, wherein the controller is configured to determine whether the desired engine speed is within one of a plurality of predetermined engine speed ranges by:
accessing modal separation values that indicate a corresponding resonant frequency for at least some of the vehicle mechanical systems,
determining an engine frequency based on the desired engine speed, and
comparing the engine frequency to the modal separation values, the desired engine speed being used as a target engine speed when the engine frequency is outside the corresponding resonant frequencies.

* * * * *